US012645673B1

(12) United States Patent
Su et al.

(10) Patent No.: US 12,645,673 B1
(45) Date of Patent: Jun. 2, 2026

(54) UNIFIED DATABASE INSIGHTS PLATFORM FOR HYBRID CLOUD

(71) Applicant: International Business Machines Corporation, Armonk, NY (US)

(72) Inventors: Jun Su, Beijing (CN); Peng Hui Jiang, Beijing (CN); Yin Xia, Beijing (CN); Douglas Brian Mueller, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/215,614

(22) Filed: May 22, 2025

(51) Int. Cl.
| | |
|---|---|
| *G06F 16/00* | (2019.01) |
| *G06F 16/242* | (2019.01) |
| *G06F 16/2452* | (2019.01) |
| *G06F 16/2453* | (2019.01) |
| *G06F 16/25* | (2019.01) |
| *G06F 16/28* | (2019.01) |

(52) U.S. Cl.
CPC .... *G06F 16/24528* (2019.01); *G06F 16/2433* (2019.01); *G06F 16/2453* (2019.01); *G06F 16/258* (2019.01); *G06F 16/284* (2019.01)

(58) Field of Classification Search
CPC .................................................. G06F 16/284
See application file for complete search history.

(56) References Cited

U.S. PATENT DOCUMENTS

| | | |
|---|---|---|
| 2020/0320075 A1 | 10/2020 | Yan et al. |
| 2021/0011911 A1* | 1/2021 | Bruce ................... G06F 16/258 |
| 2021/0334282 A1 | 10/2021 | Srinivasan et al. |
| 2021/0342316 A1 | 11/2021 | Mcpherson et al. |

FOREIGN PATENT DOCUMENTS

| | | |
|---|---|---|
| WO | 2019/047359 A1 | 3/2019 |
| WO | 2021/030524 A1 | 2/2021 |

OTHER PUBLICATIONS

Aftab, et al., "Automatic NoSQL to Relational Database Transformation with Dynamic Schema Mapping", Jul. 1, 2020, Scientific Programming, 13 Pages.
Balasubramanian Harish "Performance Analysis Of Scalable Sql And Nosql Databases : A Quantitative Approach", Jan. 1, 2024, Wayne State University Thesis, 55 Pages.

(Continued)

*Primary Examiner* — Ajith Jacob
(74) *Attorney, Agent, or Firm* — Yee & Associates, P.C.

(57) ABSTRACT

Generating queries in a heterogeneous cloud computing environment is provided. The method comprises transforming disparate statistical formats into a unified representation to standardize statistical metadata between relational databases and NoSQL databases. SQL-derived NoSQL statistics are integrated into a unified repository according to the unified representation. Mapped NoSQL statistics are integrated into relational database query optimizers. An optimal predicate pushdown strategy and an execution plan for a query across heterogeneous databases are determined according to the standardized statistical metadata. The query to the heterogeneous databases is then executed according to the relational database query optimizers and the optimal pushdown strategy and execution plan.

20 Claims, 11 Drawing Sheets

(56)         References Cited

OTHER PUBLICATIONS

Krishna Kodamasimham. "Optimizing Query Performance In Distributed Nosql Databases Through Adaptive Indexing And Data Portioning Techniques", IJCRT, Aug. 2022, vol. 10, Issue 8, 12 Pages.

No Author, "All_Tab_Statistics", Grid Computing, Oracle, Jul. 15, 2025, 2 Pages.

No Author, "Sysstat.Coldist Catalog View", Feb. 18, 2025, Db2 for Linux, UNIX and Windows, 2 Pages.

Prakash Aditi. "Demystifying Predicate Pushdown: A Guide to Optimized Database Queries", Aug. 9, 2023, Winter 2025, 17 Pages.

Stanescu, et al., "Automatic Mapping of MySQL Databases to NoSQL MongoDB" Proceedings of the Federated Conference on Computer Science and Information Systems, Nov. 7, 2016, pp. 837-840.

* cited by examiner

COMPUTING ENVIRONMENT
100

| CASE | STATISTICS MAPPING | DETAILS |
|---|---|---|
| 1 | TABLE LEVEL | MAP THE COLLECTION NAME, DOCUMENT NUMBER, ETC TO RDBMS ROWS, ROW LENGTH, ETC |
| 2 | COLUMN LEVEL | FIELD NAME, DATA TYPE: WHICH CAN BE INFERRED FROM THE DOCUMENT STRUCTURE NUMBER OF DIFFERENT VALUES: WHICH NEED TO BE CALCULATED BY WRITING AN AGGREGATE QUERY NULL VALUES: WHICH MAY BE REPRESENTED IN NoSQL AS SPECIFIC VALUES OR NON-EXISTENT THE DATA DISTRIBUTION: MAY NEED TO BE ESTIMATED THROUGH MORE COMPLEX QUERY AND AGGREGATION OPERATIONS |
| 3 | INDEX LEVEL | QUERY db.system.indexes TO OBTAIN INDEX INFORMATION |
| 4 | SYSTEM LEVEL | SIZE AND USAGE OF THE DATABASE BUFFER POOL SYSTEM RESOURCE INFORMATION, SUCH AS I/O WAIT TIME AND CPU USAGE, NETWORK DELAY AND DATABASE PERFORMANCE |

FIG. 3

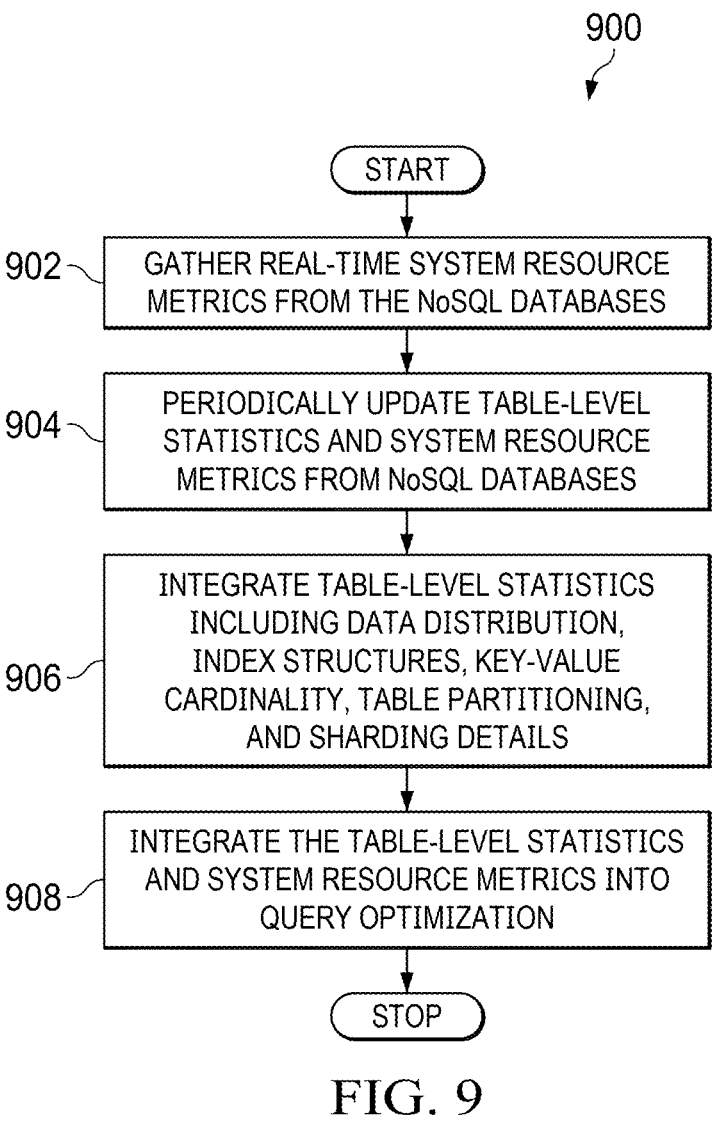

900

START

902 — GATHER REAL-TIME SYSTEM RESOURCE METRICS FROM THE NoSQL DATABASES

904 — PERIODICALLY UPDATE TABLE-LEVEL STATISTICS AND SYSTEM RESOURCE METRICS FROM NoSQL DATABASES

906 — INTEGRATE TABLE-LEVEL STATISTICS INCLUDING DATA DISTRIBUTION, INDEX STRUCTURES, KEY-VALUE CARDINALITY, TABLE PARTITIONING, AND SHARDING DETAILS

908 — INTEGRATE THE TABLE-LEVEL STATISTICS AND SYSTEM RESOURCE METRICS INTO QUERY OPTIMIZATION

STOP

FIG. 9

UNIFIED DATABASE INSIGHTS PLATFORM FOR HYBRID CLOUD

BACKGROUND

The disclosure relates generally to cloud computing and more specifically to managing data across heterogeneous data sources.

In modern enterprise environments, applications often need to access data stored across multiple heterogeneous data sources. These databases may reside in private clouds, public clouds, or a combination of both, forming a hybrid cloud infrastructure. However, managing and querying these distributed databases presents significant challenges due to variations in statistical management capabilities, query optimization, and data virtualization constraints. For example, in a private cloud environment, databases such as Oracle and SQL Server may coexist, but they employ different statistics managers and offer varying levels of statistical analysis capabilities. Meanwhile, in a hybrid cloud environment, a Data Virtualization (DV) platform integrates multiple data sources, including relational databases like Oracle and NoSQL databases like MongoDB.

A challenge arises when performing analytical queries across these heterogeneous data sources. Different databases maintain statistics in distinct formats, and NoSQL databases often lack a robust statistics manager altogether. This discrepancy leads to inefficient query execution, particularly when joining tables across different database platforms.

SUMMARY

An illustrative embodiment provides a computer-implemented method of generating queries in a heterogeneous cloud computing environment. The method comprises transforming disparate statistical formats into a unified representation to standardize statistical metadata between relational databases and NoSQL databases. SQL-derived NoSQL statistics are integrated into a unified repository according to the unified representation. Mapped NoSQL statistics are integrated into relational database query optimizers. An optimal predicate pushdown strategy and an execution plan for a query across heterogeneous databases are determined according to the standardized statistical metadata. The query to the heterogeneous databases is then executed according to the relational database query optimizers and the optimal pushdown strategy and execution plan. According to other illustrative embodiments, a computer system and a computer program product for generating queries in a heterogeneous cloud computing environment are provided.

BRIEF DESCRIPTION OF THE DRAWINGS

FIG. 3 depicts a table of statistics mapping procedures for different levels within databases in accordance with an illustrative embodiment;

FIG. 9 depicts a flowchart illustrating a method of determining the execution plan for the query in accordance with an illustrative embodiment;

DETAILED DESCRIPTION

Figure 1:
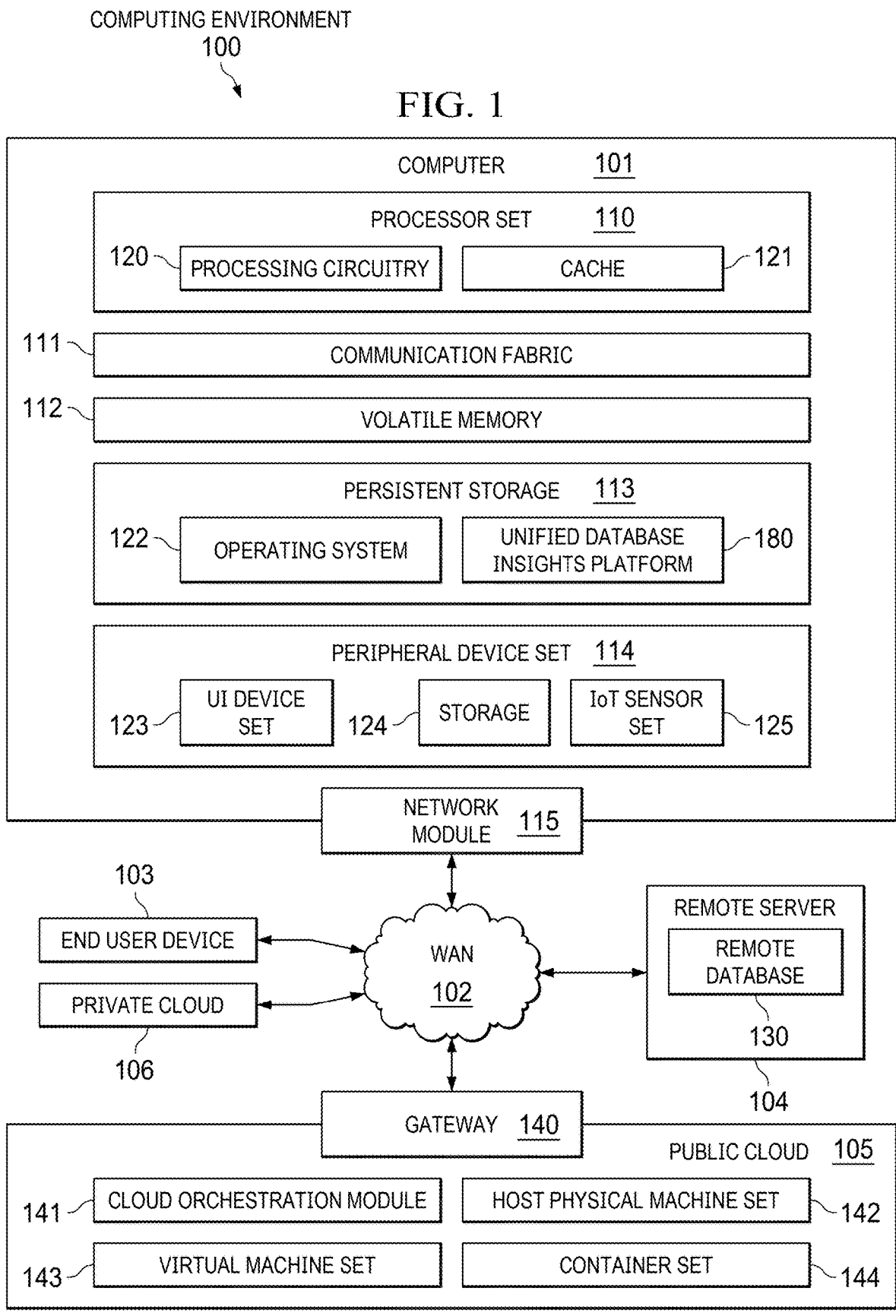
FIG. 1 is a block diagram of a computing environment in accordance with an illustrative embodiment.

A computer-implemented method of generating queries in a heterogeneous cloud computing environment. The method comprises transforming disparate statistical formats into a unified representation to standardize statistical metadata between relational databases and NoSQL databases. SQL-derived NoSQL statistics are integrated into a unified repository according to the unified representation. Mapped NoSQL statistics are integrated into relational database query optimizers. An optimal predicate pushdown strategy and an execution plan for a query across heterogeneous databases are determined according to the standardized statistical metadata. The query to the heterogeneous databases is then executed according to the relational database query optimizers and the optimal pushdown strategy and execution plan. As a result, the illustrative embodiments provide a technical effect of enabling optimized queries across heterogeneous databases in a hybrid could environment.

As part of transforming the disparate statistical formats into a unified representation the method maps SQL queries to equivalent NoSQL query languages. As a result, the illustrative embodiments provide a technical effect of enabling extraction of key statistical metadata.

Statistical insights are derived from NoSQL databases that lack built-in statistical management capabilities, wherein the statistical insights include data distribution, key frequency, and data skew detection. As a result, the illustrative embodiments provide a technical effect of deriving statistical insights that are not otherwise available for NoSQL databases.

The statistical metadata includes data type cardinality, NULL value distribution, and high-to-low key frequency analysis. As a result, the illustrative embodiments provide a technical effect of retrieving data type cardinality, NULL value distribution, and high-to-low key frequency analysis from NoSQL databases and including them alongside relational database statistics.

As part of determining the execution plan for the query the method gathers real-time system resource metrics from the NoSQL database; periodically updates table-level statistics and system resource metrics from NoSQL databases; integrates table-level statistics including data distribution, index structures, key-value cardinality, table partitioning, and sharding details; and integrates the table-level statistics and system resource metrics into query optimization. As a result, the illustrative embodiments provide a technical effect of keeping database statistics and system resource use up to date.

As part of determining an optimal predicate pushdown strategy the method determines an optimal location for predicate pushdown within database layers based on statistical data and real-time system resource utilization; implements index-based filtering for NoSQL databases to minimize full-table scans; and responsive to detecting an execution plan that requires data retrieval above a specified threshold, prevents the data retrieval to reduce cross-cloud data movement. As a result, the illustrative embodiments provide a technical effect of implementing predicate pushdown to optimize use of system resources.

The method further comprises deploying distributed agents across a hybrid cloud environment to gather real-time statistical data from heterogeneous databases; dynamically refreshing the statistical data based on evolving query execution patterns; integrating the statistical data to combine NoSQL sampling data with RDBMS statistics into a unified global statistical repository for query optimization; tracking global system performance metrics; and updating relational query optimizer decision making for cross-database queries based on the integrated statistical data and global system performance metrics. As a result, the illustrative embodiments provide a technical effect of evaluating query execution and providing feedback to the system.

A computer system comprises a storage device that stores program instructions and one or more processors operably connected to the storage device and configured to execute the program instructions to cause the system to transform disparate statistical formats into a unified representation to standardize statistical metadata between relational databases and NoSQL databases; integrate SQL-derived NoSQL statistics into a unified repository according to the unified representation; integrate mapped NoSQL statistics into relational database query optimizers; determine, according to the standardized statistical metadata, an optimal predicate pushdown strategy for a query across heterogeneous databases; determine, according to the standardized statistical metadata, an execution plan for the query across heterogeneous databases; and execute the query to the heterogeneous databases according to the relational database query optimizers and the optimal pushdown strategy and execution plan. As a result, the illustrative embodiments provide a technical effect of enabling optimized queries across heterogeneous databases in a hybrid could environment.

As part of transforming the disparate statistical formats into a unified representation the system maps SQL queries to equivalent NoSQL query languages. As a result, the illustrative embodiments provide a technical effect of enabling extraction of key statistical metadata.

The system derives statistical insights from NoSQL databases that lack built-in statistical management capabilities, wherein the statistical insights include data distribution, key frequency, and data skew detection. As a result, the illustrative embodiments provide a technical effect of deriving statistical insights that are not otherwise available for NoSQL databases.

The statistical metadata used by the system includes data type cardinality, NULL value distribution, and high-to-low key frequency analysis. As a result, the illustrative embodiments provide a technical effect of retrieving data type cardinality, NULL value distribution, and high-to-low key frequency analysis from NoSQL databases and including them alongside relational database statistics.

As part of determining the execution plan for the query the system gathers real-time system resource metrics from the NoSQL database; periodically updates table-level statistics and system resource metrics from NoSQL databases; integrates table-level statistics including data distribution, index structures, key-value cardinality, table partitioning, and sharding details; and integrates the table-level statistics and system resource metrics into query optimization. As a result, the illustrative embodiments provide a technical effect of keeping database statistics and system resource use up to date.

As part of determining an optimal predicate pushdown strategy the system determines an optimal location for predicate pushdown within database layers based on statistical data and real-time system resource utilization; implements index-based filtering for NoSQL databases to minimize full-table scans; and responsive to detecting an execution plan that requires data retrieval above a specified threshold, prevents the data retrieval to reduce cross-cloud data movement. As a result, the illustrative embodiments provide a technical effect of implementing predicate pushdown to optimize use of system resources.

The system further executes program instructions for deploying distributed agents across a hybrid cloud environment to gather real-time statistical data from heterogeneous databases; dynamically refreshing the statistical data based on evolving query execution patterns; integrating the statistical data to combine NoSQL sampling data with RDBMS statistics into a unified global statistical repository for query optimization; tracking global system performance metrics; and updating relational query optimizer decision making for cross-database queries based on the integrated statistical data and global system performance metrics. As a result, the illustrative embodiments provide a technical effect of evaluating query execution and providing feedback to the system.

A computer program product generates queries in a heterogeneous cloud computing environment. A persistent storage medium has program instructions configured to cause one or more processors to transform disparate statistical formats into a unified representation to standardize statistical metadata between relational databases and NoSQL databases; integrate SQL-derived NoSQL statistics into a unified repository according to the unified representation; integrate mapped NoSQL statistics into relational database query optimizers; determine, according to the standardized statistical metadata, an optimal predicate pushdown strategy for a query across heterogeneous databases; determine, according to the standardized statistical metadata, an execution plan for the query across heterogeneous databases; and execute the query to the heterogeneous databases according to the relational database query optimizers and the optimal pushdown strategy and execution plan.

As part of transforming the disparate statistical formats into a unified representation, the computer program product maps SQL queries to equivalent NoSQL query languages. As a result, the illustrative embodiments provide a technical effect of enabling extraction of key statistical metadata.

The computer program product derives statistical insights from NoSQL databases that lack built-in statistical management capabilities, wherein the statistical insights include data distribution, key frequency, and data skew detection. As a result, the illustrative embodiments provide a technical effect of deriving statistical insights that are not otherwise available for NoSQL databases.

As part of determining the execution plan for the query the computer program product gathers real-time system resource metrics from the NoSQL database; periodically updates table-level statistics and system resource metrics from NoSQL databases; integrates table-level statistics including data distribution, index structures, key-value cardinality, table partitioning, and sharding details; and integrates the table-level statistics and system resource metrics into query optimization. As a result, the illustrative embodiments provide a technical effect of keeping database statistics and system resource use up to date.

As part of determining an optimal predicate pushdown strategy the computer program product determines an optimal location for predicate pushdown within database layers based on statistical data and real-time system resource utilization; implements index-based filtering for NoSQL databases to minimize full-table scans; and responsive to detecting an execution plan that requires data retrieval above a specified threshold, prevents the data retrieval to reduce cross-cloud data movement. As a result, the illustrative embodiments provide a technical effect of implementing predicate pushdown to optimize use of system resources.

The computer program product further comprises instructions for deploying distributed agents across a hybrid cloud environment to gather real-time statistical data from heterogeneous databases; dynamically refreshing the statistical data based on evolving query execution patterns; integrating the statistical data to combine NoSQL sampling data with RDBMS statistics into a unified global statistical repository for query optimization; tracking global system performance metrics; and updating relational query optimizer decision making for cross-database queries based on the integrated statistical data and global system performance metrics. As a result, the illustrative embodiments provide a technical effect of evaluating query execution and providing feedback to the system.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 shows a pictorial representation of a computing environment in which illustrative embodiments may be implemented. Computing environment 100 contains an example of an environment for the execution of at least some of the computer code involved in performing the inventive methods, such Unified Database Insights Platform 180.

In addition to Unified Database Insights Platform 180, computing environment 100 includes, for example, computer 101, wide area network (WAN) 102; end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and Unified Database Insights Platform 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in Unified Database Insights Platform 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in Unified Database Insights Platform 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to a "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The illustrative embodiments can be implemented as a Software as a Service model (SaaS) or using an existing infrastructure. The flexibility of deployment allows an organization to utilize the best option for their needs. API connectors can be leveraged to get data from various systems like SIEM (Security Information and Event Management) or EDR (Endpoint Detection and Response). This connection method allows the organization to add as many systems as needed through the API connector.

The illustrative embodiments recognize and take into account that applications often need to access data stored across multiple heterogeneous data sources. These databases may reside in private clouds, public clouds, or a combination of both, forming a hybrid cloud infrastructure. However, managing and querying these distributed databases presents significant challenges due to variations in statistical management capabilities, query optimization, and data virtualization constraints.

The illustrative embodiments also recognize and take into account that different databases maintain statistics in distinct formats, and NoSQL databases often lack a robust statistics manager altogether, leading to inefficient query execution, particularly when joining tables across different database platforms. For example, a customer attempting to join tables between MongoDB and Oracle faces query optimization issues. Since MongoDB lacks a statistics manager, predicates cannot be effectively pushed down to optimize query performance. In this scenario, without accurate statistics from MongoDB, the query optimizer cannot efficiently determine an optimal execution plan, leading to performance bottlenecks.

The illustrative embodiments provide a Unified Database Insights Platform that delivers comprehensive statistical insights across heterogeneous databases in hybrid cloud environments. By harmonizing statistical analysis between relational and NoSQL databases, the platform facilitates efficient query execution, optimizes predicate pushdown, and enhances overall performance. This solution bridges the gap in statistical management across diverse data sources, improving query optimization and execution efficiency.

The Unified Database Insights Platform enables intelligent query execution by leveraging comprehensive statistical insights across heterogeneous databases. This leveraging of statistical insights ensures that predicate pushdown is strategically applied to the optimal data source, reducing data transfer overhead, enhancing execution efficiency, and improving overall performance. By harmonizing statistical data from both relational and NoSQL databases, the Unified Database Insights Platform overcomes existing challenges in cost estimation, query optimization, and data movement, ultimately leading to a more efficient and scalable hybrid cloud data infrastructure.

The Unified Database Insights Platform comprises several components:

Statistics Mapping for NoSQL and Relational Databases-Establishing a standardized framework to map and interpret statistics between structured relational databases and schema-less NoSQL databases.

Enhanced Table Catalog for NoSQL Databases-Introducing a comprehensive catalog that integrates remote table statistics, system statistics (e.g., CPU, memory, I/O (Input/Output) utilization from remote servers), and metadata for NoSQL data sources.

Global Statistical Collection in Hybrid Databases-Developing a mechanism to collect, unify, and store statistical data across multiple hybrid data sources to facilitate better query planning and optimization.

New Cost Model for NoSQL and Relational Database Clusters-Designing a novel cost model that accurately estimates query execution costs in a mixed environment, accounting for differences in data structure, indexing, and storage formats.

Optimized Predicate Pushdown for NoSQL and RDBMS (Relational Database Management Systems)-Enhancing query optimizers to determine the optimal data source for predicate pushdown, minimizing data movement, and improving execution efficiency in hybrid cloud environments by reducing data transfer overhead.

Figure 2:
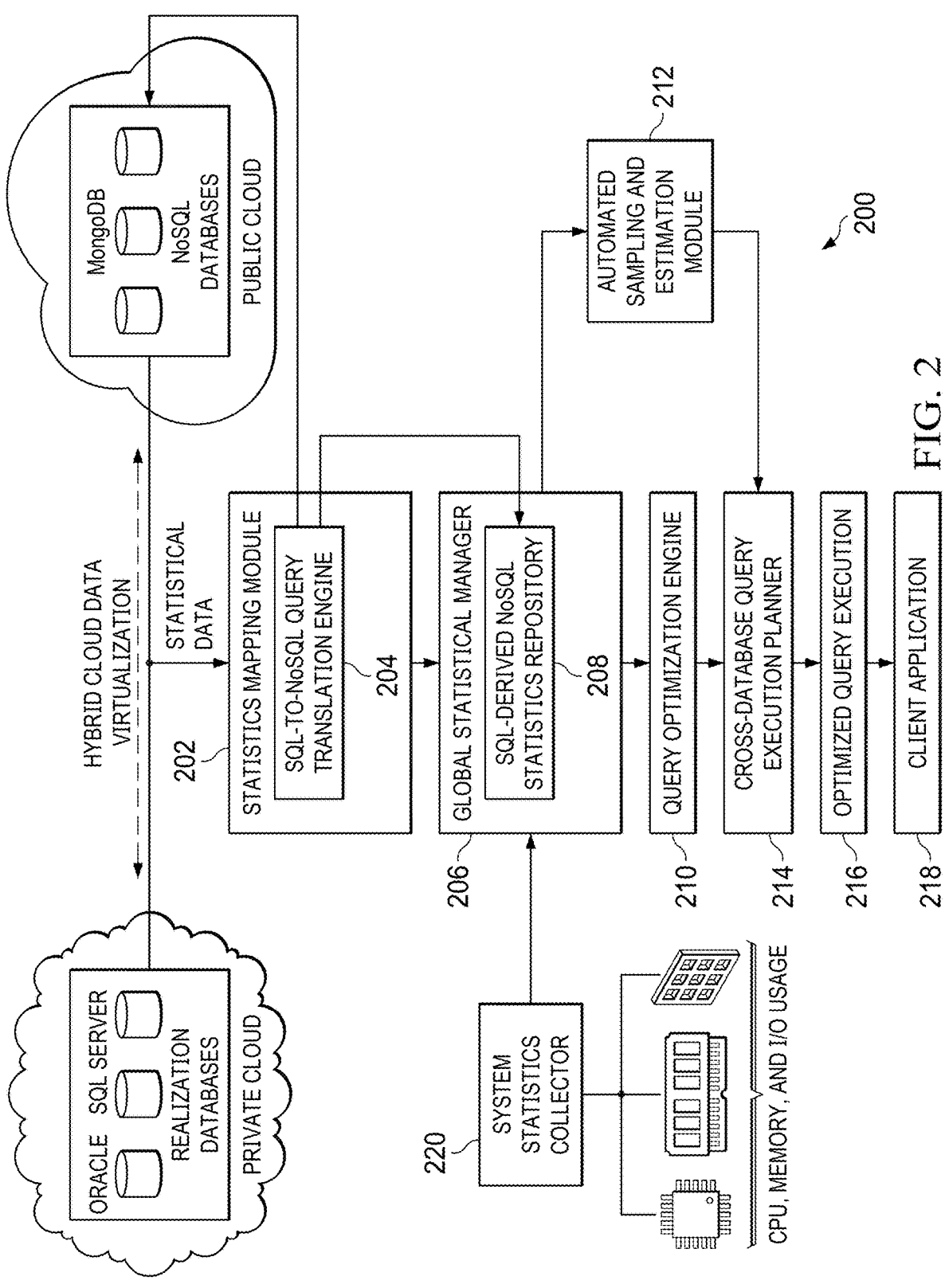
FIG. 2 depicts a diagram illustrating an architecture for a Unified Database Insights Platform in accordance with an illustrative embodiment.

FIG. 2 depicts a diagram illustrating an architecture for a Unified Database Insights Platform in accordance with an illustrative embodiment. Unified Database Insights Platform architecture 200 is an example implementation of Unified Database Insights Platform 180 in computing environment 100.

Statistics Mapping Module 202 is configured to standardize statistical metadata between relational databases and NoSQL databases by transforming disparate statistical formats into a unified representation. Statistics Mapping Module 202 further includes a SQL-to-NoSQL Query Translation Engine 204 that maps SQL queries to equivalent NoSQL query languages to extract statistical insights, including data type cardinality, NULL value distribution, and high-to-low key frequency analysis. This mapping process allows relational query optimizers to leverage NoSQL statistics for improved query execution planning. Relational query optimizers are components of relational database management systems (RDBMS) that determine the most efficient way to execute SQL queries. The relational query optimizers analyze alternative ways to retrieve desired data and choose the best one based on factors such as available indexes, table statistics (e.g., row counts, data distribution), join methods (e.g., nested loops, hash joins), query constraints (e.g., WHERE clauses), and system cost estimates (I/O, CPU usage, memory usage).

Global Statistical Manager 206 collects, processes, and stores statistical insights from multiple data sources, including NoSQL and relational databases, to support query optimization. Global Statistical Manager 206 integrates SQL-derived NoSQL statistics into a unified repository 208, ensuring accurate and consistent metadata across hybrid cloud environments. System Statistics Collector 220 provides an improved statistic catalog for NoSQL databases to Global Statistical Manager 206 (explained below).

Query Optimization Engine 210 utilizes the standardized statistical metadata to determine optimal predicate pushdown strategies and execution plans for queries spanning multiple databases.

Automated Sampling and Estimation Module 212 derives statistical insights from NoSQL databases that lack built-in statistical management capabilities, including data distribution, key frequency, and data skew detection.

Cross-Database Query Execution Planner 214 integrates mapped NoSQL statistics into relational database query optimizers to enhance join order selection, index utilization, and execution efficiency from which architecture 200 can perform optimized query execution 216 on the heterogeneous databases and return the search results to a client application 218.

By providing a unified statistical framework for heterogeneous databases, including SQL-derived NoSQL statistics, Unified Database Insights Platform architecture 200 enables improved query performance, optimized data movement, and enhanced hybrid cloud database management.

Table 300 in FIG. 3 presents statistics mapping procedures for different levels within databases. In a hybrid cloud environment, relational databases (e.g., Oracle, SQL Server) and NoSQL databases (e.g., MongoDB, Cassandra) utilize different statistical management mechanisms, making cross-database query optimization challenging. The Unified Database Insights Platform introduces a Statistics Mapping mechanism to unify the representation of statistical information across different databases, enabling seamless translation of statistical data between relational and NoSQL databases. By establishing a unified statistical metadata model, the platform converts diverse database statistics into a standardized statistical information format, allowing query optimizers to effectively interpret and leverage data distribution insights. Since NoSQL databases often lack comprehensive statistical management capabilities, the platform infers statistical data—such as data distribution, key frequency, and data skew—through intelligent automated sampling and estimation techniques. By mapping NoSQL statistical data into relational database query optimizers, the system enhances decision-making in join order selection, index scans, and execution plans, thereby improving the efficiency of hybrid queries.

Figure 4:
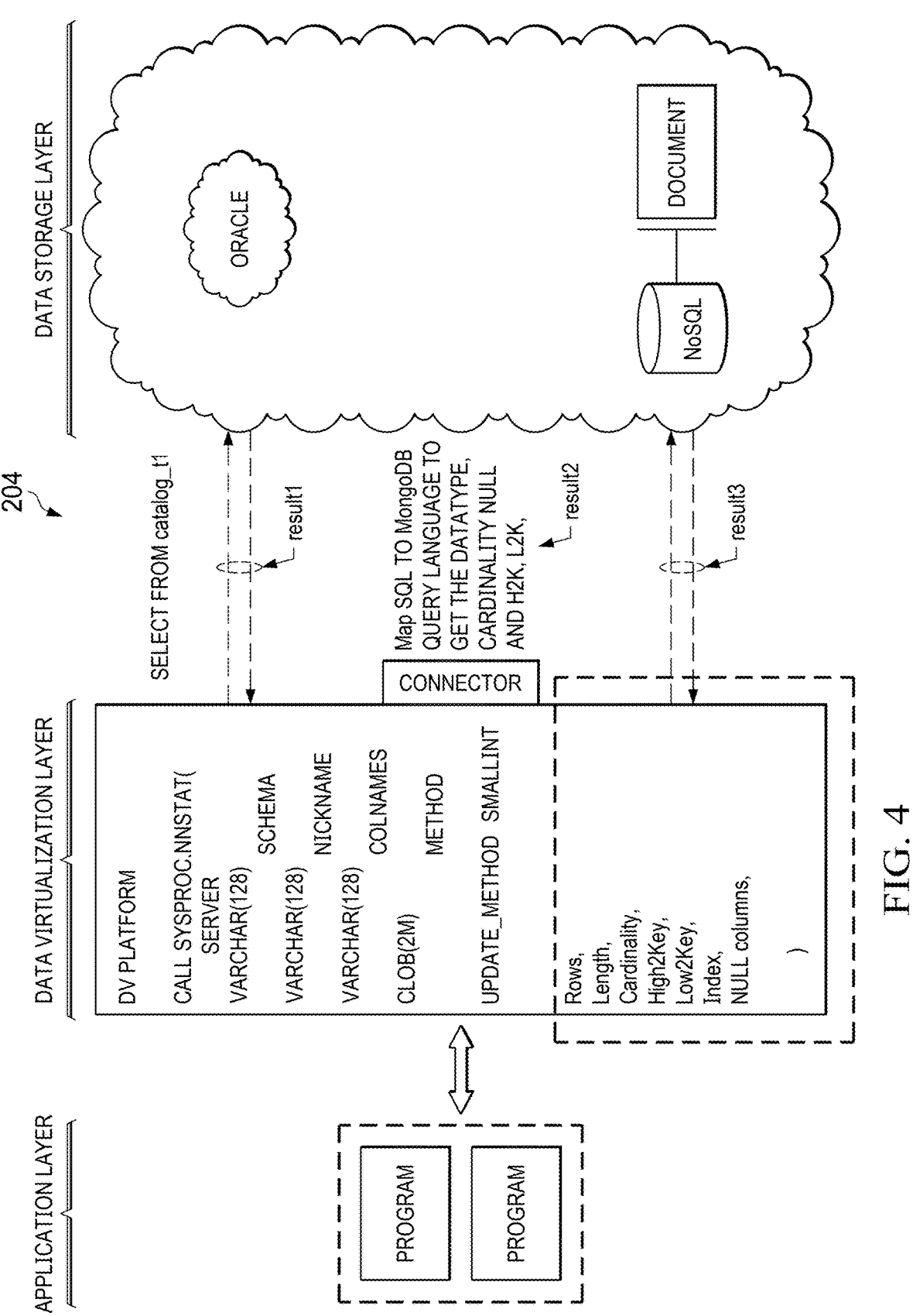
FIG. 4 depicts a block diagram illustrating mapping of SQL to NoSQL query language in accordance with an illustrative embodiment.

FIG. 4 depicts a block diagram illustrating mapping of SQL to NoSQL query language in accordance with an illustrative embodiment. FIG. 4 illustrates a detailed example of SQL-to-NoSQL Query Translation Engine 204.

In a hybrid cloud environment, effective query optimization requires comprehensive statistical insights from both relational and NoSQL databases. However, NoSQL databases often lack built-in statistical management, making query planning less efficient. To address this problem, the illustrative embodiments introduce an SQL-to-NoSQL Query Translation Engine 204 within the Statistics Mapping Module 202 to convert SQL queries into equivalent NoSQL query languages. This enables the extraction of key statistical metadata, including data type cardinality, NULL value distribution, and high-to-low key frequency analysis.

The retrieved statistics are integrated into a Global Statistical Manager, where they are stored in a SQL-Derived NoSQL Statistics Repository alongside relational database statistics. By unifying these insights, the Query Optimization Engine 210 can generate more accurate cost models, optimize predicate pushdown strategies, and enhance execution plans for queries spanning multiple database systems. This approach ensures reduced data movement, improved join order selection, and efficient cross-database query execution within hybrid cloud environments.

Figure 5:
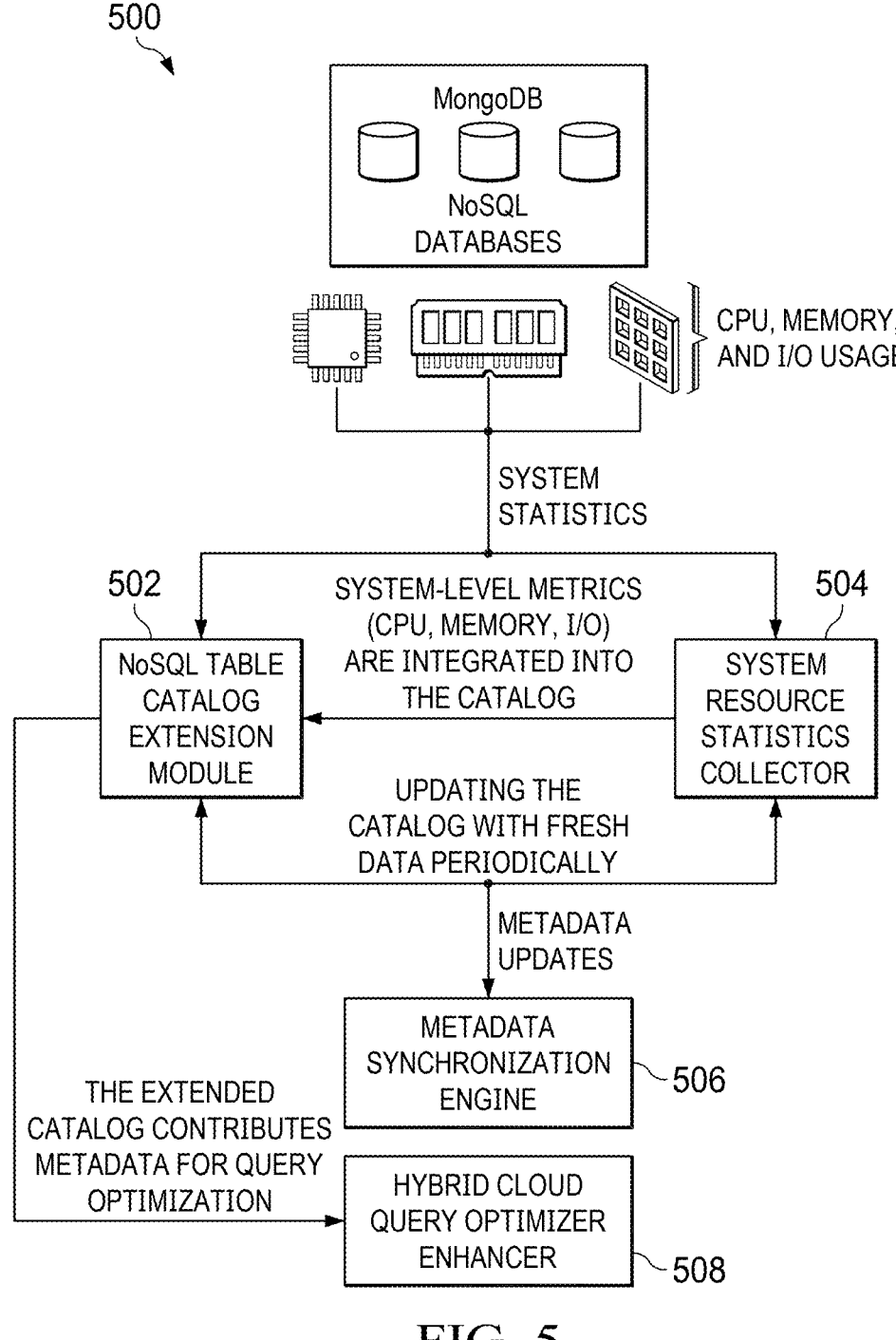
FIG. 5 depicts an architecture for a system statistics collector in accordance with an illustrative embodiment.

FIG. 5 depicts an architecture for a system statistics collector in accordance with an illustrative embodiment. Architecture 500 is an example implementation of System Statistics Collector 220 in FIG. 2.

NoSQL databases typically lack a structured table catalog similar to those found in relational databases, making it challenging for query optimizers to accurately assess data characteristics. To address this, Unified Database Insights Platform introduces an Enhanced Table Catalog, integrating remote table statistics and system resource metrics to improve query planning and execution efficiency. Remote Table Statistics captures essential metadata such as table size, indexing structure, sharding details, and key distribution, enabling more accurate query optimization and execution planning. System Resource Statistics collects CPU load, memory utilization, and I/O throughput from remote servers, allowing the optimizer to make informed decisions on computational resource allocation and intelligent workload distribution. Automated Metadata Synchronization periodically retrieves updated schema and statistical metadata from NoSQL databases and synchronizes them with the global table catalog, ensuring that query optimizers operate with the latest available data.

By integrating these enhancements, the system bridges the gap in NoSQL metadata management, facilitating improved query execution efficiency in hybrid cloud environments. To implement the functionality described above, architecture 500 incorporates several modules.

NoSQL Table Catalog Extension Module 502 enhances the existing NoSQL metadata system by integrating remote table statistics, including data distribution, index structures, key-value cardinality, table partitioning, and sharding details to improve query execution planning.

System Resource Statistics Collector 504 gathers real-time system resource metrics from NoSQL database servers, including CPU utilization, memory consumption, network bandwidth availability, and I/O performance characteristics, ensuring query optimizers can make resource-aware decisions.

Metadata Synchronization Engine 506 periodically retrieves and updates table-level statistics and system resource metrics from NoSQL databases, maintaining a continuously updated table catalog that supports optimized query planning.

Hybrid Cloud Query Optimizer Enhancer 508 integrates the extended table catalog and system resource statistics into the query optimization process, allowing cross-database query planners to leverage NoSQL metadata for improved execution strategies.

By structuring these modules, the system effectively expands NoSQL table catalogs with persistent query-relevant metadata and system-aware statistics, ensuring better query optimization and execution efficiency in hybrid cloud environments.

Figure 6:
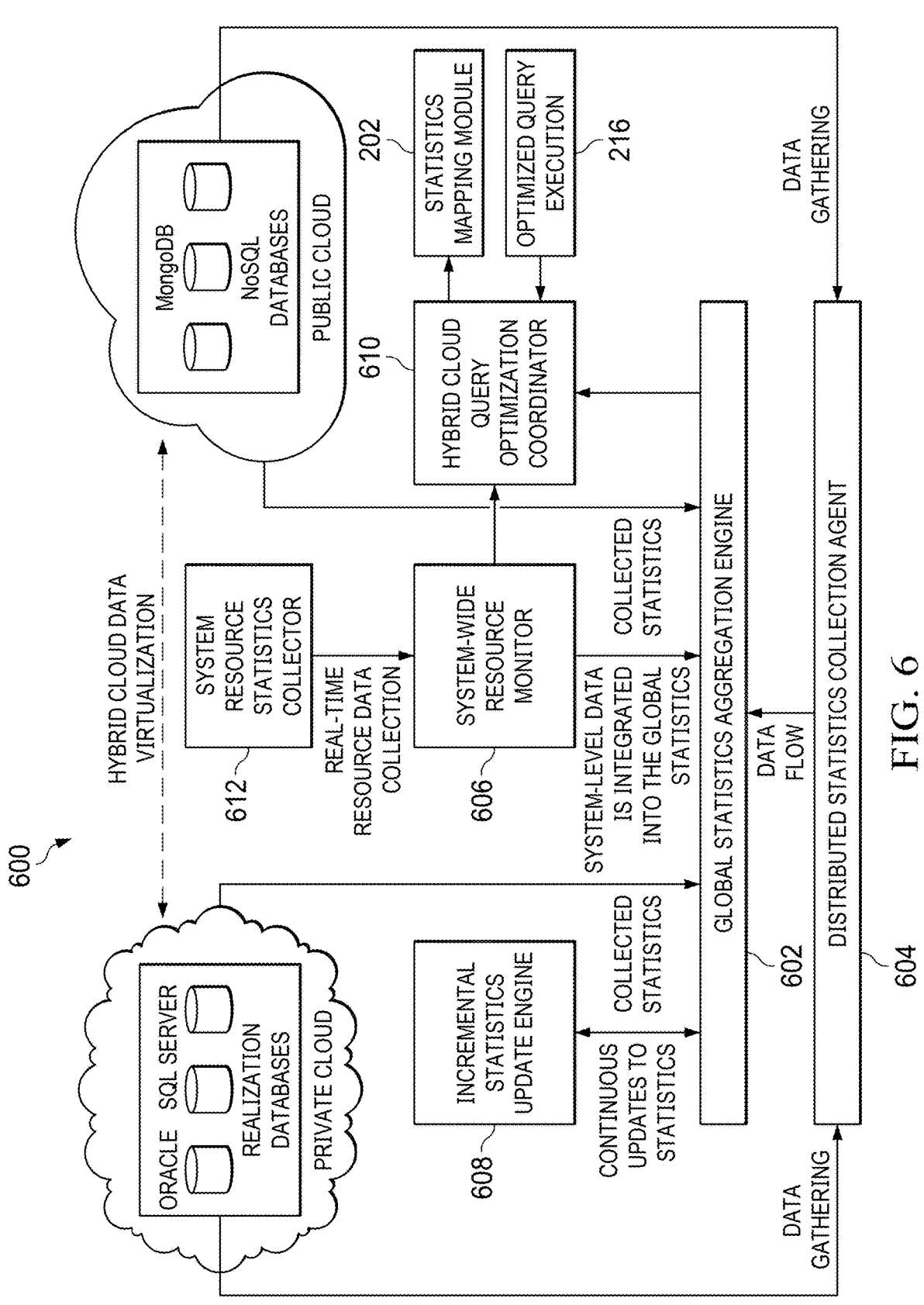
FIG. 6 depicts an architecture flow for global statistical collection in hybrid databases in accordance with an illustrative embodiment.

FIG. 6 depicts an architecture for global statistical collection in hybrid databases in accordance with an illustrative embodiment. To optimize cross-database query execution, the illustrative embodiments introduce a Global Statistical Collection mechanism 600 that unifies both database-level and system-level statistics management across hybrid cloud environments.

Multi-Level Statistical Data Aggregation-Collects statistics at the database, table, and column levels, integrating NoSQL sampling data with RDBMS statistical insights to form a comprehensive global view. Additionally, it incorporates system-wide metrics, including CPU, memory, network, and I/O utilization, to enhance query planning decisions.

Distributed Statistical Collection Architecture-Utilizes a distributed agent-based system to gather statistics from various data sources in a hybrid cloud environment. This architecture consolidates both database statistics and system resource metrics into a central query optimization hub, enhancing the optimizer's ability to make data-driven decisions.

Incremental Updates and Adaptive Optimization-Dynamically updates both database statistics and system resource usage patterns based on query workloads. This ensures the optimizer continuously adapts to changing data distributions and system performance fluctuations, reducing query execution costs and improving efficiency.

By integrating system-level statistics into the global statistical collection framework, this invention enables a more adaptive, accurate, and resource-aware query execution strategy, optimizing performance across hybrid cloud environments.

Global Statistical Collection mechanism 600 evaluates the optimized query execution 216 and provides feedback to Statistics Mapping Module 202 to improve future performance.

Global Statistics Aggregation Engine 602 collects and integrates multi-level statistical data, including database-level, table-level, and column-level statistics, combining NoSQL sampling data with RDBMS statistics to construct a unified global statistical repository for query optimization.

Distributed Statistics Collection Agent 604 deploys lightweight, distributed agents across hybrid cloud environments to gather real-time statistical data from heterogeneous databases, adopting adaptive data collection strategies to minimize overhead while ensuring efficient aggregation of large-scale hybrid database statistics.

System-Wide Resource Monitor 606 tracks global system-level metrics, including CPU utilization, memory consumption, I/O performance, and network bandwidth from both NoSQL and RDBMS servers, integrating with the Global Statistics Aggregation Engine to enhance resource aware query optimization and workload distribution.

Incremental Statistics Update Engine 608 dynamically refreshes collected statistics based on evolving query execution patterns, ensuring query optimizers leverage the most up-to-date statistical insights while supporting real-time incremental updates to avoid full recomputations and reduce processing overhead in dynamic workloads.

Hybrid Cloud Query Optimization Coordinator 610 utilizes both aggregated database statistics and system performance metrics to enhance optimizer decision-making for cross-database queries, working in conjunction with the Hybrid Cloud Query Optimizer Enhancer to deliver a unified optimization framework for hybrid database environments.

System Resource Statistics Collector 612 provides real-time resource data collection for the System-Wide Resource Monitor 606.

The system for enhancing query cost estimation in hybrid database environments introduces an adaptive cost model that accurately evaluates query execution costs for both NoSQL and relational databases. Storage Cost Modeling establishes query cost evaluation models tailored to diverse database storage architectures, including B+ tree indexes, LSM trees, and columnar storage, to estimate I/O costs associated with query execution. This enables precise modeling of storage access patterns across heterogeneous database systems.

Computational Cost Estimation incorporates NoSQL-specific data sharding and replication strategies to assess the cost of distributed query execution. Additionally, integrates real-time system resource utilization metrics, including CPU load, memory consumption, and I/O performance, to optimize query distribution and workload balancing.

Adaptive Cost Model Refinement implements self-learning mechanisms that dynamically adjust cost parameters based on observed query execution performance. By continuously refining the cost estimation process using real-time feedback, the system enhances query optimizer accuracy, leading to improved execution plan selection and reduced processing overhead.

By integrating a cost-aware optimization framework that adapts to NoSQL-specific architectures, system resource constraints, and real-time workload dynamics, the system enables precise cost estimation, optimized query planning, and enhanced performance across hybrid cloud database environments.

To implement the functionality described, several modules are introduced. A Storage Cost Evaluation Engine models query execution costs based on different database storage structures, including B+ tree indexes, LSM trees, and columnar storage. It analyzes I/O costs by evaluating data access patterns, indexing efficiency, and storage layouts across NoSQL and relational databases. A Distributed Computational Cost Analyzer assesses the cost of executing queries across distributed NoSQL clusters and relational database clusters by incorporating data sharding, replication strategies, and system-wide resource availability. It factors in CPU utilization, memory consumption, network bandwidth, and I/O performance to guide query distribution strategies. A System Resource-Aware Query Cost Monitor collects and integrates real-time CPU, memory, network, and I/O performance metrics from NoSQL and relational database servers. This module ensures cost estimations reflect current system resource conditions to optimize execution plans dynamically. Adaptive Cost Model Refinement Module continuously improves cost estimation accuracy by leveraging query execution feedback. It dynamically updates cost parameters based on workload patterns and past query performance, enabling self-learning and adaptive optimization for hybrid database environments.

By integrating storage-aware, resource-aware, and adaptive learning capabilities, these modules collectively enhance query cost estimation accuracy, execution efficiency, and workload distribution across NoSQL and relational database clusters.

Figure 7:
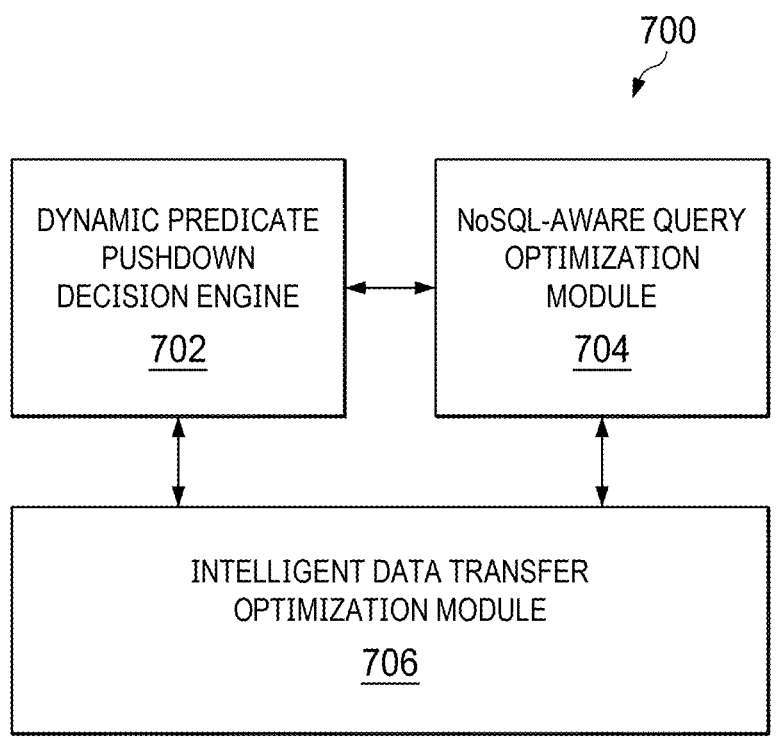
FIG. 7 depicts an architecture for optimizing predicate pushdown in accordance with an illustrative embodiment.

FIG. 7 depicts an architecture for optimizing predicate pushdown in accordance with an illustrative embodiment. Predicate pushdown is an optimization technique used in databases to improve query performance by moving filter conditions (predicates) as close to the data source as possible, thereby minimizing the amount of data processed and transferred.

Predicate pushdown architecture 700 optimizes predicate pushdown strategies in hybrid database query execution, improves data filtering efficiency, and reduces data transfer overhead. Predicate pushdown architecture 700 may be implemented within Query Optimization Engine 210.

Dynamic Predicate Pushdown Decision Engine 702 determines the optimal location for predicate pushdown (NoSQL database, RDBMS, or Data Virtualization (DV) layer) based on global statistical insights and real-time system resource monitoring, ensuring efficient query execution.

NoSQL-Aware Query Optimization Module 704 implements index-based filtering techniques for NoSQL databases such as MongoDB and Cassandra, minimizing unnecessary full-table scans and improving query performance by leveraging native indexing mechanisms.

Intelligent Data Transfer Optimization Module 706 reduces cross-cloud data movement by preventing excessive data retrieval when suboptimal query plans are detected, enhancing query execution efficiency and optimizing resource utilization in hybrid cloud environments.

By introducing adaptive predicate pushdown strategies, NoSQL-aware query enhancements, and intelligent data transfer minimization, this system improves query execution performance, reduces network overhead, and enhances overall efficiency in hybrid cloud database environments.

Figure 8:
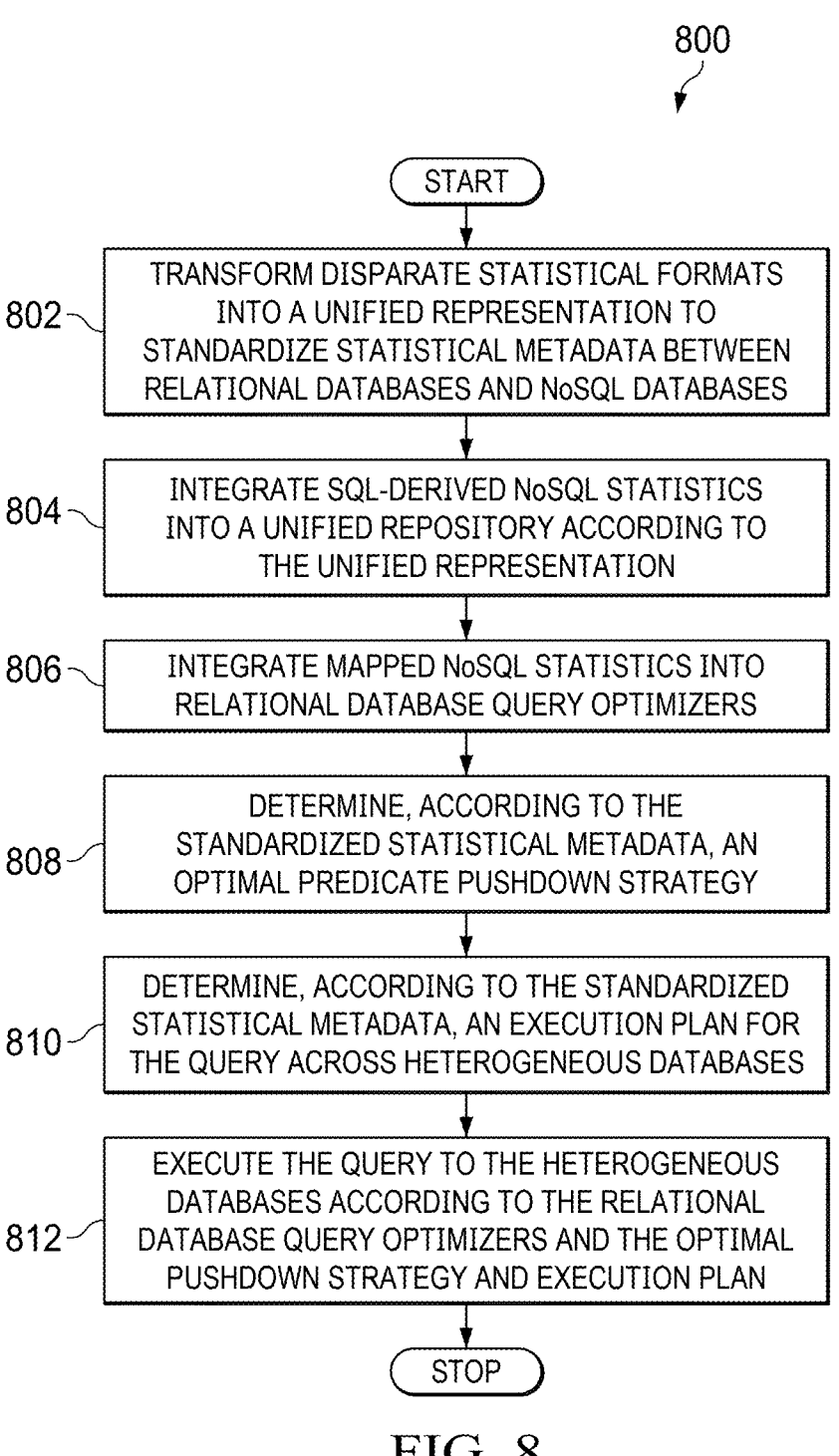
FIG. 8 depicts a flowchart illustrating a method of generating queries in a heterogeneous cloud computing environment in accordance with an illustrative embodiment.

FIG. 8 depicts a flowchart illustrating a method of generating queries in a heterogeneous cloud computing environment in accordance with an illustrative embodiment. Process 800 may be implemented in Unified Database Insights Platform architecture 200 in FIG. 2.

Process 800 begins by transforming disparate statistical formats into a unified representation to standardize statistical metadata between relational databases and NoSQL databases (step 802). Transforming the disparate statistical formats into a unified representation may further comprises mapping SQL queries to equivalent NoSQL query languages. The statistical metadata may include data type cardinality, NULL value distribution, and high-to-low key frequency analysis.

Process 800 integrating SQL-derived NoSQL statistics into a unified repository according to the unified representation (step 804).

Mapped NoSQL statistics are integrated into relational database query optimizers (step 806). Statistical insights may be derived from NoSQL databases that lack built-in statistical management capabilities, wherein the statistical insights include data distribution, key frequency, and data skew detection.

Process 800 determines, according to the standardized statistical metadata, an optimal predicate pushdown strategy (step 808) and an execution plan for a query across heterogeneous databases (step 810).

Process 800 then executes the query to the heterogeneous databases according to the relational database query optimizers and the optimal pushdown strategy and execution plan (step 812). Process 800 then ends.

FIG. 9 depicts a flowchart illustrating a method of determining the execution plan for the query in accordance with an illustrative embodiment. Process 900 is a detailed example of step 810 in FIG. 8.

Process 900 begins by gathering real-time system resource metrics from the NoSQL databases (step 902). Process 900 periodically updates table-level statistics and system resource metrics from NoSQL databases (step 904).

Table-level statistics are integrated including data distribution, index structures, key-value cardinality, table partitioning, and sharding details (step 906). Process 900 then integrates the table-level statistics and system resource metrics into query optimization (step 908). Process 900 then ends.

Figure 10:
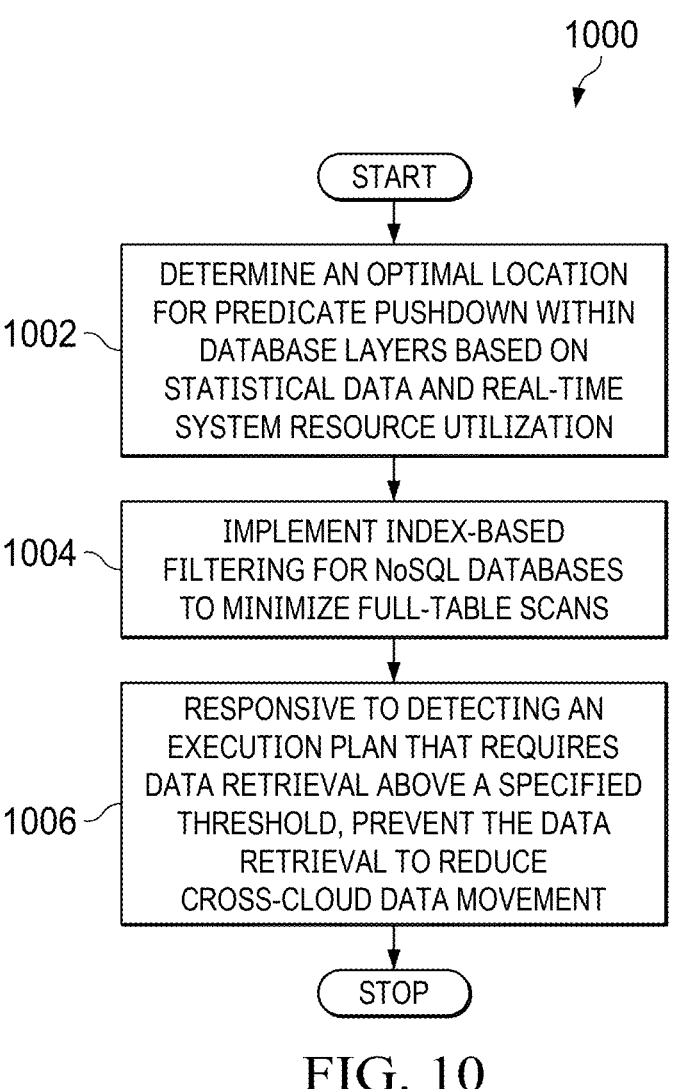
FIG. 10 depicts a flowchart illustrating a method of determining an optimal predicate pushdown strategy in accordance with an illustrative embodiment.

FIG. 10 depicts a flowchart illustrating a method of determining an optimal predicate pushdown strategy in accordance with an illustrative embodiment. Process 1000 is a detailed example of step 808 in FIG. 8.

Process 1000 begins by determining an optimal location for predicate pushdown within database layers based on statistical data and real-time system resource utilization (step 1002).

Process 1000 implements index-based filtering for NoSQL databases to minimize full-table scans (step 1004).

Responsive to detecting an execution plan that requires data retrieval above a specified threshold, the data retrieval is prevented to reduce cross-cloud data movement (step 1006). Process 1000 then ends.

Figure 11:
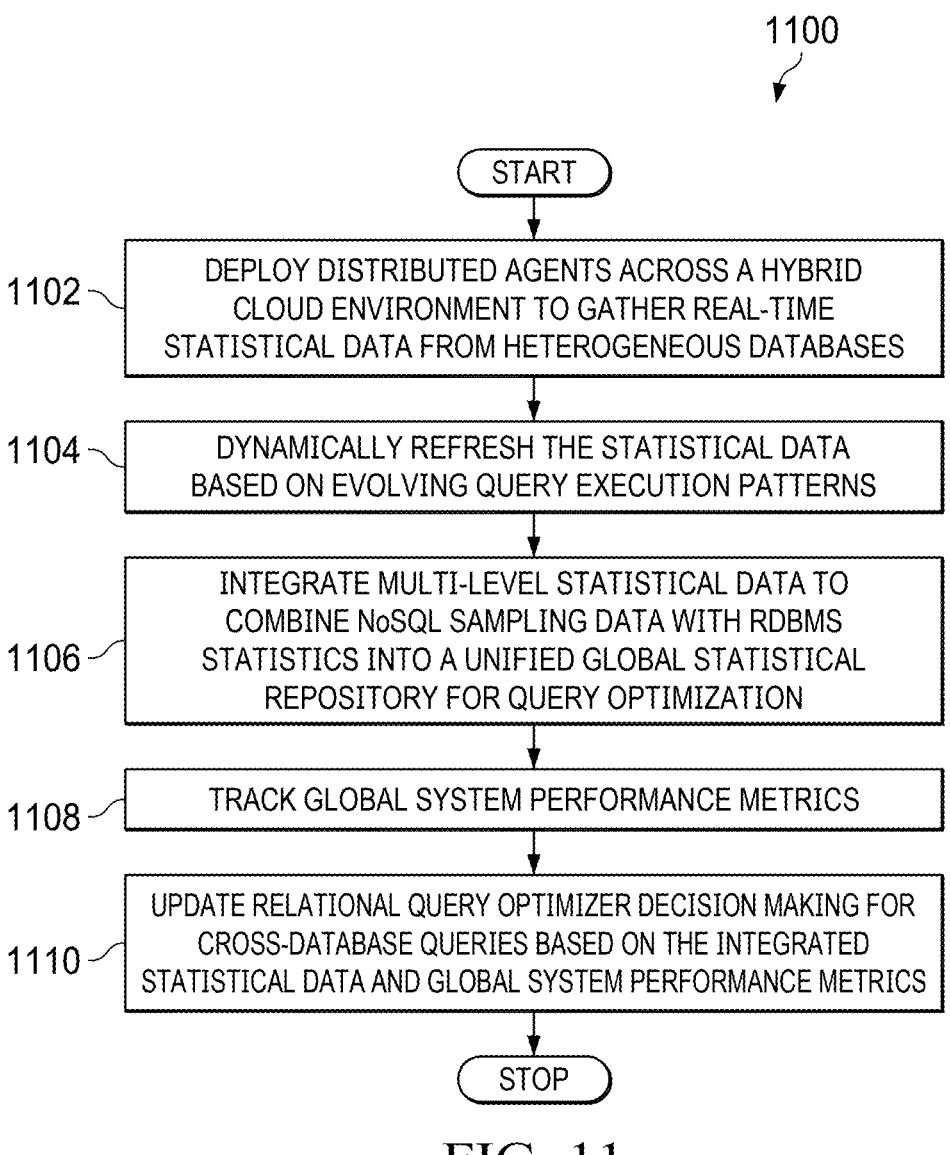
FIG. 11 depicts a flowchart illustrating a process for evaluating optimized query execution in accordance with an illustrative embodiment.

FIG. 11 depicts a flowchart illustrating a process for evaluating optimized query execution in accordance with an illustrative embodiment. Process 1100 may be implemented after execution of the query in step 812 and provide feedback to the system.

Process 1100 begins by deploying distributed agents across a hybrid cloud environment to gather real-time statistical data from heterogeneous databases (step 1102). The statistical data is dynamically refreshed based on evolving query execution patterns (step 1104).

Process 1100 integrates the statistical data to combine NoSQL sampling data with RDBMS statistics into a unified global statistical repository for query optimization (step 1106).

Process 1100 tracks global system performance metrics (step 1108) and updates relational query optimizer decision making for cross-database queries based on the integrated statistical data and global system performance metrics (step 1110). Process 1100 then ends.

As used herein, "a number of" when used with reference to items, means one or more items. For example, "a number of parameters" is one or more parameters. As another example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described.

For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method of generating queries in a heterogeneous cloud computing environment, the method comprising:

transforming disparate statistical formats into a unified representation to standardize statistical metadata between relational databases and NoSQL databases;

integrating SQL-derived NoSQL statistics into a unified repository according to the unified representation;

integrating mapped NoSQL statistics into relational database query optimizers;

determining, according to the standardized statistical metadata, an optimal predicate pushdown strategy for a query across heterogeneous databases;

determining, according to the standardized statistical metadata, an execution plan for the query across heterogeneous databases; and executing the query to the heterogeneous databases according to the relational database query optimizers and the optimal pushdown strategy and execution plan.

2. The method of claim 1, wherein transforming disparate statistical formats into a unified representation further comprises mapping SQL queries to equivalent NoSQL query languages.

3. The method of claim 1, further comprising deriving statistical insights from NoSQL databases that lack built-in statistical management capabilities, wherein the statistical insights include data distribution, key frequency, and data skew detection.

4. The method of claim 1, wherein the statistical metadata includes data type cardinality, NULL value distribution, and high-to-low key frequency analysis.

5. The method of claim 1, wherein determining the execution plan for the query further comprises:

gathering real-time system resource metrics from the NoSQL databases;

periodically updating table-level statistics and system resource metrics from NoSQL databases;

integrating table-level statistics including data distribution, index structures, key-value cardinality, table partitioning, and sharding details; and integrating the table-level statistics and system resource metrics into query optimization.

6. The method of claim 1, wherein determining an optimal predicate pushdown strategy further comprises:

determining an optimal location for predicate pushdown within database layers based on statistical data and real-time system resource utilization;

implementing index-based filtering for NoSQL databases to minimize full-table scans; and responsive to detecting an execution plan that requires data retrieval above a specified threshold, preventing the data retrieval to reduce cross-cloud data movement.

7. The method of claim 1, further comprising:

deploying distributed agents across a hybrid cloud environment to gather real-time statistical data from heterogeneous databases;

dynamically refreshing the statistical data based on evolving query execution patterns;

integrating the statistical data to combine NoSQL sampling data with RDBMS statistics into a unified global statistical repository for query optimization;

tracking global system performance metrics; and updating relational query optimizer decision making for cross-database queries based on the integrated statistical data and global system performance metrics.

8. A system for generating queries in a heterogeneous cloud computing environment, the system comprising:

a storage device that stores program instructions;

one or more processors operably connected to the storage device and configured to execute the program instructions to cause the system to:

transform disparate statistical formats into a unified representation to standardize statistical metadata between relational databases and NoSQL databases;

integrate SQL-derived NoSQL statistics into a unified repository according to the unified representation;

integrate mapped NoSQL statistics into relational database query optimizers;

determine, according to the standardized statistical metadata, an optimal predicate pushdown strategy for a query across heterogeneous databases;

determine, according to the standardized statistical metadata, an execution plan for the query across heterogeneous databases; and execute the query to the heterogeneous databases according to the relational database query optimizers and the optimal pushdown strategy and execution plan.

9. The system of claim 8, wherein, in transforming the disparate statistical formats into a unified representation, the processors further execute program instructions to cause the system to map SQL queries to equivalent NoSQL query languages.

10. The system of claim 8, wherein the processors further execute program instructions to cause the system to derive statistical insights from NoSQL databases that lack built-in statistical management capabilities, wherein the statistical insights include data distribution, key frequency, and data skew detection.

11. The system of claim 8, wherein the statistical metadata includes data type cardinality, NULL value distribution, and high-to-low key frequency analysis.

12. The system of claim 8, wherein, in determining the execution plan for the query, the processors further execute program instructions to cause the system to:

gather real-time system resource metrics from the NoSQL databases;

periodically update table-level statistics and system resource metrics from NoSQL databases;

integrate table-level statistics including data distribution, index structures, key-value cardinality, table partitioning, and sharding details; and integrate the table-level statistics and system resource metrics into query optimization.

13. The system of claim 8, wherein, in determining an optimal predicate pushdown strategy, the processors further execute program instructions to cause the system to:

determine an optimal location for predicate pushdown within database layers based on statistical data and real-time system resource utilization;

implement index-based filtering for NoSQL databases to minimize full-table scans; and responsive to detecting an execution plan that requires data retrieval above a specified threshold, prevent the data retrieval to reduce cross-cloud data movement.

14. The system of claim 8, wherein the processors further execute program instructions to cause the system to:

deploying distributed agents across a hybrid cloud environment to gather real-time statistical data from heterogeneous databases;

dynamically refreshing the statistical data based on evolving query execution patterns;

integrating the statistical data to combine NoSQL sampling data with RDBMS statistics into a unified global statistical repository for query optimization;

tracking global system performance metrics; and updating relational query optimizer decision making for cross-database queries based on the integrated statistical data and global system performance metrics.

15. A computer program product for generating queries in a heterogeneous cloud computing environment, the computer program product comprising:

a persistent storage medium having program instructions configured to cause one or more processors to:

transform disparate statistical formats into a unified representation to standardize statistical metadata between relational databases and NoSQL databases;

integrate SQL-derived NoSQL statistics into a unified repository according to the unified representation;

integrate mapped NoSQL statistics into relational database query optimizers;

determine, according to the standardized statistical metadata, an optimal predicate pushdown strategy for a query across heterogeneous databases;

determine, according to the standardized statistical metadata, an execution plan for the query across heterogeneous databases; and execute the query to the heterogeneous databases according to the relational database query optimizers and the optimal pushdown strategy and execution plan.

16. The computer program product of claim 15, wherein transforming the disparate statistical formats into a unified representation further comprises instructions for mapping SQL queries to equivalent NoSQL query languages.

17. The computer program product of claim 15, further comprising instructions for deriving statistical insights from NoSQL databases that lack built-in statistical management capabilities, wherein the statistical insights include data distribution, key frequency, and data skew detection.

18. The computer program product of claim 15, wherein determining the execution plan for the query further comprises instructions for:

gathering real-time system resource metrics from the NoSQL databases;

periodically updating table-level statistics and system resource metrics from NoSQL databases;

integrating table-level statistics including data distribution, index structures, key-value cardinality, table partitioning, and sharding details; and integrating the table-level statistics and system resource metrics into query optimization.

19. The computer program product of claim 15, wherein determine an optimal predicate pushdown strategy further comprises instructions for:

determining an optimal location for predicate pushdown within database layers based on statistical data and real-time system resource utilization;

implementing index-based filtering for NoSQL databases to minimize full-table scans; and responsive to detecting an execution plan that requires data retrieval above a specified threshold, preventing the data retrieval to reduce cross-cloud data movement.

20. The computer program product of claim 15, further comprising instructions for:

deploying distributed agents across a hybrid cloud environment to gather real-time statistical data from heterogeneous databases;

dynamically refreshing the statistical data based on evolving query execution patterns;

integrating the statistical data to combine NoSQL sampling data with RDBMS statistics into a unified global statistical repository for query optimization;

tracking global system performance metrics; and updating relational query optimizer decision making for cross-database queries based on the integrated statistical data and global system performance metrics.

* * * * *